United States Patent [19]

Dean et al.

[11] Patent Number: 5,383,326
[45] Date of Patent: Jan. 24, 1995

[54] SHEET MATERIAL GRIPPING SYSTEM

[75] Inventors: Ralph T. Dean, Englewood; Richard D. Valentine, Hillsboro, both of Ohio

[73] Assignee: Premark FEG Corporation, Wilmington, Del.

[21] Appl. No.: 157,878

[22] Filed: Nov. 24, 1993

[51] Int. Cl.⁶ .................. B65B 53/00; B65B 41/12
[52] U.S. Cl. ..................... 53/556; 53/389.2; 294/902; 403/19; 403/255; 414/753
[58] Field of Search ............ 53/556, 389.2, 389.1; 294/902; 226/92; 271/204, 277; 414/20, 753; 403/19, 247, 255, 294

[56] References Cited

U.S. PATENT DOCUMENTS 3,856,246 12/1974 Sinko ........................ 403/294 X
4,501,106 2/1985 Treiber et al. .................. 53/168 X
4,693,362 9/1987 Kemmerer et al. ............ 271/204 X

FOREIGN PATENT DOCUMENTS 2114650 8/1983 United Kingdom ............ 403/19

Primary Examiner—Linda B. Johnson
Attorney, Agent, or Firm—Thompson, Hine And Flory

[57] ABSTRACT

Gripper pads for a gripping device such as that found in a stretch wrap packaging machine are provided with means enabling their simple installation and mechanical attachment to the fingers of a film gripping unit without necessitating the removal of the gripper unit from the machine. Each pad includes a film-contacting surface which is essentially unaffected chemically by plasticizers found in the common stretch films employed in this field. The film-contacting surface is one which is compressible but also has a fast recovery for returning to its original uncompressed condition to accommodate relatively high speed wrapping. Laminated to the film-contacting surface is a solid urethane or comparable material which has strength capabilities enabling the formation of stems or runners on the side opposite the film-contacting surface so that the stems can be threaded through openings in the fingers and used as pulling tools to anchor heads connected to the stems to be anchored in the fingers. The need for removal of the film gripping device, scraping the old cemented pads from the fingers, cementing new pads in their place and reinstalling the same or another film gripping assembly in the machine is thus obviated.

21 Claims, 1 Drawing Sheet

SHEET MATERIAL GRIPPING SYSTEM

This invention relates generally to packaging machines for wrapping meats and produce in transparent stretch film, and in particular to a novel gripper pad and means for mounting such pad on a gripping finger in such a machine. A plurality of such gripper pads grip the leading edge of film and pull it from a roll to a position at which the product to be wrapped is forced laterally against the film plane, creating tension tending to pull the film out of the device.

BACKGROUND OF THE INVENTION

Gripper pads used in stretch wrap packaging machines such as found in U.S. Pat. No. 4,501,106 issued to Fritz F. Treiber et. al. on Feb. 26, 1985 were cemented on the underside of a fixed upper jaw of a film gripping device. They have been effective in performing their task of gripping and pulling the lead edge of film from a supply roll and maintaining their grip as underfolding of film occurred according to the description in the patent. The patent also discloses that the upper jaw includes thirteen fingers, each of which has its own individual pad cemented thereto. The actual number of fingers may vary, as determined by the machine design for a particular range of package sizes to be handled.

Although very effective in operation, the pads were subjected to wear and had to be replaced frequently, as often as every four to six weeks in instances of high machine usage. The location of the film gripping device in the machine in a rather tightly confined area and the fact that the pads were cemented to the undersides of the fingers necessitated that at least a portion of the film gripping device had to be removed from the machine, the pads scraped therefrom, the surfaces cleaned and new pads cemented in place of the old. This became a severe inconvenience for the machine owner if pad replacement was done on the spot, unless the unit was not needed for wrapping packages at the time and for any period thereafter for the cement to cure. The machine down-time problem was resolved in part by having the repairman carry replacement gripper assemblies with him. The repairman would remove and replace the assembly with a spare assembly, returning the worn one to the shop for installation of new pads and reuse on another machine. However, even such replacement could result in a machine down-time of from one to one and one-half hours. When occurring during the machine warranty period, the manufacturer would absorb the several hundred dollar cost of a service call. After expiration of the warranty period, this became a cost obligation of the machine owner, who not only had to absorb the cost of a service call, but also had to suffer the loss of wrapping productivity each time a gripping assembly required replacement. This presented still further machine operation problems, in that the time between servicing to correct gripper pad wear was often deliberately prolonged by the machine owner in order to minimize cost. This could cause poor film gripping, resulting in film pulling out of the gripping device prematurely. This, in turn, could cause an occasional package to be miswrapped, tripping package detectors to shut down the machine while the miswrapped package was removed. Removal of an improperly wrapped package could be easy or difficult, depending on several factors not requiring discussion here, but necessarily causing aggravation and further productivity loss.

SUMMARY OF THE INVENTION

Gripper pads for a gripping device such as that found in a stretch wrap packaging machine are provided with means enabling their simple installation and mechanical attachment to the fingers of a film gripping unit without necessitating the removal of the gripper unit from the machine. Each pad includes a film-contacting surface which is essentially unaffected chemically by plasticizers found in the common stretch films employed in this field. The film-contacting surface is one which is compressible but also has a fast recovery for returning to its original uncompressed condition to accommodate relatively high speed wrapping. Laminated to the film-contacting surface is a solid urethane or comparable material which has strength capabilities enabling the formation of stems or runners on the side opposite the film-contacting surface so that the stems can be threaded through openings in the fingers and used as pulling tools to anchor heads connected to the stems to be anchored in the fingers. The need for removal of the film gripping device, scraping the old cemented pads from the fingers, cementing new pads in their place and reinstalling the same or another film gripping assembly in the machine is thus obviated.

A principal object is to provide a novel gripper pad for a stretch wrap packaging machine, which pad is easily installed without removal of a film gripping assembly from the machine.

Another object is to provide a gripper pad for a gripper finger of a sheet material handling machine, which pad is mechanically held in operating position on the finger.

A further object is to provide a laminated gripper pad comprising a porous sheet-contacting layer and a body portion attached thereto, which body portion can serve both as an installation tool and an anchoring head for retaining the pad on a gripping finger.

Other objects and advantages will become apparent from the accompanying description and drawings.

IN THE DRAWINGS

DESCRIPTION OF THE PREFERRED EMBODIMENT

Although the novel gripper pad of this invention may be usable in connection with any type of gripping finger system fox sheet material which must be firmly gripped and retained in its gripped position, its most practical use is in a package wrapping machine such as that of U.S. Pat. No. 4,501,106 issued to Fritz F. Treiber et. al. on Feb. 26, 1985. The disclosure of the '106 patent is incorporated herein by reference for a complete understanding of the background of the invention and the problems solved by this invention.

Figure 1:
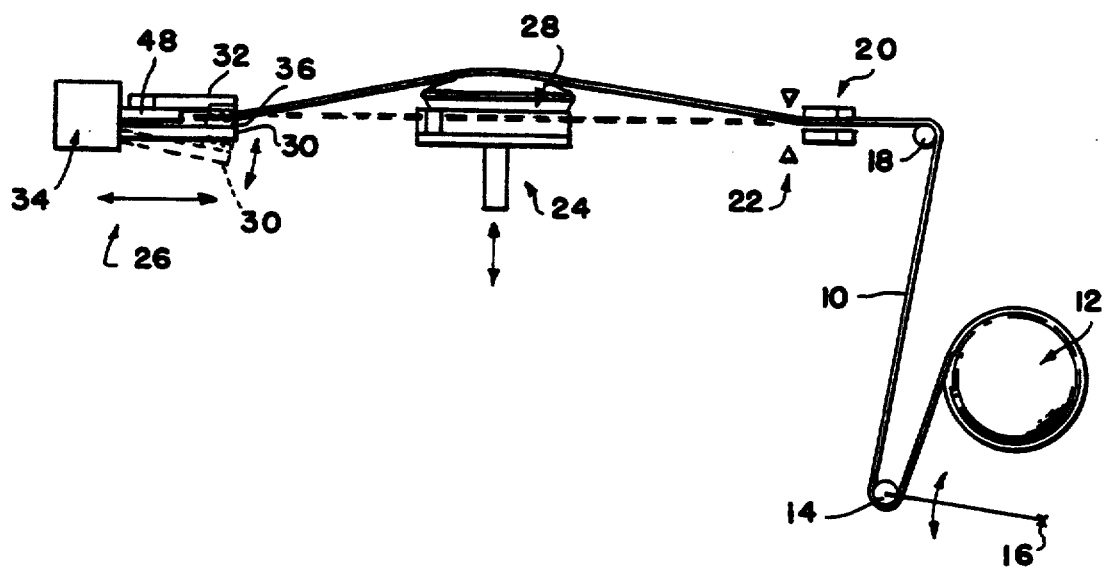
FIG. 1 is a simplified side elevational view illustrating the technique of pulling stretch film from a supply roll and moving it into position over a product to be wrapped while holding the lead edge of the film in a film gripping device.
Figure 2:
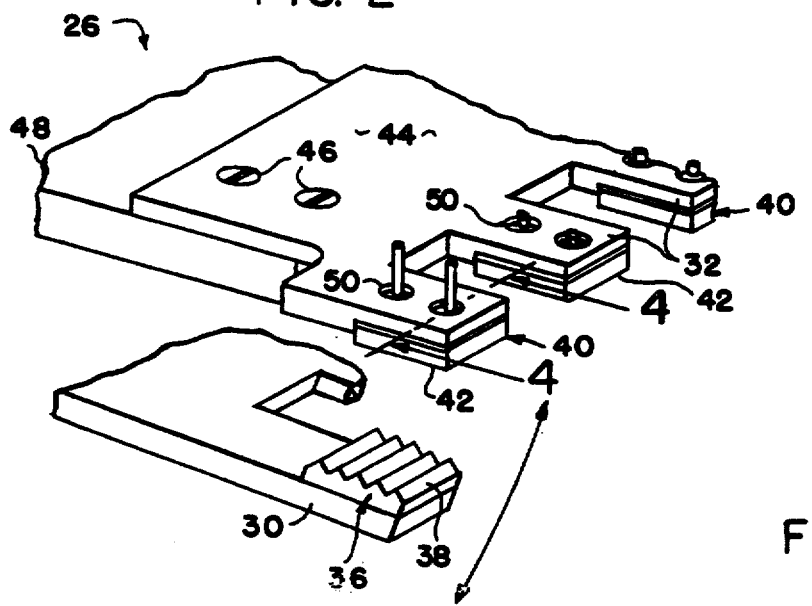
FIG. 2 is an enlarged isometric view of portions of the gripping device at the left end of FIG. 1, incorporating the novel pads.

FIG. 1 is a simplified representation of the type of film wrapping machine depicted in '106 patent, with numerous operating functions and parts omitted for ease of understanding. Film 10 is supplied on a roll 12 thereof which is mounted on the framework of the machine. The film is trained over a tensioning roll 14, commonly called a dancer roll because of its movement in an arc about a pivot point 16. The film 10 then passes over an idler roller 18 and extends horizontally between a set of upper and lower laterally-spaced guiding fingers, generally designated 20. Leftward of the fingers 20 as shown in FIG. 1 is a film cut-off device 22 for severing the film crosswise, leaving a free end of the film loosely supported between the spaced fingers 20. At start-up, the film is manually threaded in its path from the roll 12 past the cut-off device, cut-off being performed manually, and the machine is ready to operate, with a free end of the film resting between the guiding fingers 20.

As an unwrapped package is fed to the machine, it is measured in length and width and comes to rest on a vertically-movable elevator 24. The measurement determines which one of several different-width rolls will be selected and how far a gripping device 26 will reciprocate to a film stretching position at the left end of a stroke, all as described in the aforementioned '106 patent. For present purposes, however, assume that only one roll 12 is supplied, and the same length stroke of reciprocation is taken each time a length of film is to be supplied over a package 28 on the elevator 24.

Assuming the gripping device 26 is in the position shown and a package has been fed to the machine, the device will move from the left to right so that fingers of the gripping device will overlap and interdigitate with the guiding fingers 20. While travelling rightwardly and as they span the film free edge resting between the guiding fingers 20, a set of lower fingers 30 are in their open dotted-line position, out of interference with the free edge. At the same time, a set of upper fingers are in a fixed position, passing closely above the free edge of the film between the fingers 20. The lower fingers are pivotable about a support 34 for the gripping device 26. The lower fingers move between a closed sheet-grasping position shown in full lines, and an open sheet-releasing position shown in dotted lines. For ease of explanation, lower fingers 30 will hereinafter be designated the first fingers and upper fingers 32 called the second fingers. It should be understood that either or both sets of fingers 30 or 32 can be movable for grasping and releasing sheet material, depending upon a particular machine design.

With the gripping device fingers 30 and 32 now interdigitated with the guiding fingers 20, they can close to grip the free edge of the film and then return leftward to the solid-line position shown, to pull a section of film over the package on the elevator. Prestretching of the film takes place just before the gripping device 26 arrives at the left end of its travel. This is accomplished by applying a brake (not shown) to the film roll 12 and simultaneously operating the tensioning roll 14 to its lower film tensioning position. Thus, it is essential to have a firm grip on the free edge of the film between the gripping fingers 30 and 32 in order that the film cannot pull out from between the fingers.

To achieve and retain the tight grip, the machine of the '106 patent utilized a resilient serrated gripper pad having a film-contacting surface opposing a sponge material gripper pad which was provided with a relatively flat film-contacting surface 42. The materials of a set of gripper pads 36 and 40 used in the present invention may be the same as in the '106 patent, where they are a 70 durometer neoprene and a 60 durometer closed-cell urethane sponge, respectively. Each pad 36 and 40 is provided with film-contacting surfaces 38 and 42 respectively. The sponge material is produced by the Rogers Corporation of East Woodstock, Conn. (USA) under the trademark Poron, having catalog number #4701-05-20125-1637. By closed-cell, it is meant that the voids of the sponge do not interconnect. The material itself and the fact that liquids cannot enter the voids keeps the pads free from absorbing plasticizers from the stretch film and fat from meats, should fat somehow find its way to the gripper pad film-contacting surfaces.

The fingers 32 are extensions of a relatively thin, flat plate or bar 44 which is attached by screws or bolts 46 to a member 48 connected to the reciprocable support 34. As pads similar to 40 wore in the '106 patent machine, the plate comparable to plate 44 had to be removed from its supporting member. The undersides of the fingers 32 were then scraped clean manually (often a time-consuming job) and new pads were cemented in place. Naturally, this put the machine out of commission for a while, even where a replacement plate was immediately installed. These techniques have been accepted practice for over ten years of existence of the design of the machine of the '106 patent. That machine design and the cost and downtime occasioned by the necessity to replace the pads is well appreciated by the assignee of the '106 patent, which is also the assignee of the present application. During the machine warranty period, that cost was borne by the manufacturer.

The present invention solves the time-consuming problem of cementing and scraping the gripper pads by providing a design of gripper pad which includes a means for physically attaching the pads to the gripper fingers 32 without ever having to remove the plate 44 from the machine. As will be seen from the construction of gripper pads 40 about to be described, pads 40 having worn film-contacting surfaces 42 are easily "popped" out of their fingers and new pads 40 pulled into place. This is demonstrated in FIG. 3 which shows a finger-pulling action, and in FIG. 4, which shows a cross-section of a preferred form of pad 40 anchored firmly to its finger 32.

Figure 4:
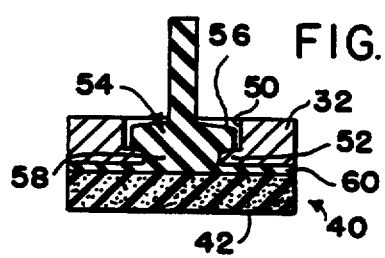
FIG. 4 is an enlarged fragmentary elevational view taken substantially along lines 4—4 of FIG. 2, illustrating the manner in which a pad is anchored in operative position in a gripper finger.

Each finger 32 is provided with a pair of closely-spaced through-holes 50, each hole having a shoulder 52 as shown in FIG. 4. This shoulder forms an anchoring means for retaining a pad 40 tightly to its respective finger 32. Each pad 40 has a porous readily-compressible portion consisting of the section containing the surface 42 and a non-porous or solid body portion 54. The body portion 54 is made of a resilient material such as urethane produced by Air Products and Chemicals Company of Lehigh Valley, Penn. under catalog #A-9 60. The latter two digits designate its durometer. The porous material must be quickly compressible to conform the film to the irregular serrations of gripper pad 36. The material of the body portion 54 must have strength to resist tearing to enable the material to be positioned in the fingers 32 as well as to resist shear created during film tensioning.

The machine in which these pads are used has a normal package wrapping rate of around thirty packages per minute. This requires that the surface 42 contacting the film be quick to recover to its original flat state after film has been released by the gripping device 26 and the device is returned toward the guiding fingers 20 to draw a new section of film from the roll 12. The Poron material described above has nicely performed that function, and continues to do so in the present gripper pad design.

Anchoring of the pads 40 to the second fingers 32 is accomplished by providing a pair of anchoring head portions 56 for each pad. Each head portion 56 extends away from the surface 42 and is integral with a column 58, a flat section 60 and a pull stem 62. In producing pads 40, a flat sheet of the porous material is placed in the bottom of a mold and the remainder of the urethane material cast or molded to laminate the porous and non-porous sections into an integral sheet of pads 40. The pull stems 62 are formed from what is commonly referred to as a sprue in the casting art. The pads 40 can be produced as a large sheet and then cut into individual pads. One or more pads on adjacent fingers can be cast or cut together, providing they have the proper shape for interdigitating with the guiding fingers 20 at the time they grip the film.

Figure 3:
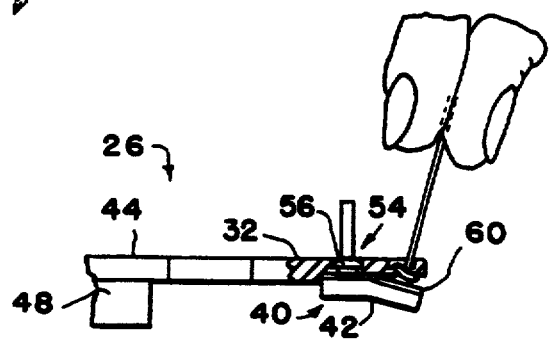
FIG. 3 illustrates the technique of installing the novel pad in a gripper finger.

Referring to FIG. 3, the laminated gripper pad 40 is installed on the second finger 32 by initially threading the two stems 62 through the through-holes 50, holding one stem at a time and pulling it upwardly until the head portion 56 squeezes through the smaller diameter of the hole 50. At that time, the anchoring head portion passes the shoulder 52 and that head portion and column 58 tightly grip to the inner surfaces of the hole 50. The second of the stems is then similarly pulled as shown in FIG. 3.

Depending on the machine construction, if the stems would interfere with other machine parts during reciprocation of the gripping device 26, they can be snipped off with cutters of any kind. The stems are not necessary for pad removal, so their cutting is of no significance. For eventual replacement after wear, a worn pad can be easily removed by pushing downwardly with a pointed tool, even a ball point pen, engaging the top of a head portion 56 fairly centrally and forcing the head back through the smaller diameter of the hole 50. Once that has been done, it is a simple matter to install a replacement pad in the same finger 32.

While we have demonstrated a preferred embodiment of our invention, it is apparent that various modifications can be made without departing from the spirit and scope of the claims. For example, while each through-hole 50 is shown as being of two different-diameter axially-aligned holes which form the shoulder 52, a single diameter hole could be used. In that instance, the planar surface of finger 32 opposite the gripper pad 40 serves a function comparable to that of shoulder 52 in anchoring the head portion 56 to the gripping finger 32. Additionally, while a pair of cylindrical pad anchoring means is preferred, a single anchoring means is also feasible. To make the pad 40 non-rotational, the body portion and through-hole can be elongated laterally.

It should also be clear that while our invention is described in connection with a stretch film wrapping machine, it is applicable to any sheet material gripping device where ease of removal and installation of resilient gripper pads is of importance.

Having described our invention, we claim:

1. A gripping device for firmly grasping an edge of thin sheet material and retaining said grasp while said sheet material is placed under tension essentially in its own plane, said device comprising a first gripping finger on one side of said plane and a second gripping finger on the opposing side of said plane, at least one of said fingers being movable toward and away from said plane between an open sheet-releasing position and a closed sheet-grasping position, opposing resilient sheet gripping members on distal ends of said fingers, said gripping member on said first finger having an irregular sheet-contacting surface and being of a relatively high durometer and said gripping member on said second finger having a relatively flat sheet-contacting surface and being of a durometer lower than said gripping member on said first finger to cause sheet material gripped between said surfaces to conform to the shape of the irregular surface when the gripping fingers are moved to their closed position, the improvement comprising means for physically attaching said lower durometer gripping surface to said second gripping finger, including:

at least the distal end of said second gripping finger being relatively thin and flat and having a pair of closely spaced shouldered through-holes extending therethrough perpendicularly to said flat distal end; and said lower durometer gripping member comprising:
a). a readily compressible gripper pad having a side facing said sheet material which side includes said relatively flat sheet-contacting surface;
b). a body portion supporting said pad from the side thereof remote from said sheet material; and
c). a pair of resilient pad anchoring means connected to said body portion opposite said pad and being spaced apart the same as the spacing between said through-holes, each of said anchoring means including a column portion of a size and length corresponding to the size and length of a smaller-diameter portion of the through-hole in which it is to be received, an anchoring head portion of a size greater than said smaller-diameter portion of said through-hole, said anchoring head portion being sufficiently compressible to squeeze through said smaller-diameter portion, and a pull stem extending outwardly from said anchoring head portion perpendicularly away from the sheet-contacting surface for a length enabling said stem to be threaded through a through-hole, manually gripped and physically pulled to apply a force to said head portion for urging said head portion therethrough to firmly anchor said head portion in said shouldered through-hole.

2. A gripping device according to claim 1 wherein said sheet material is a stretchable transparent film for wrapping packages of meats and produce.

3. A gripping device according to claim 1 wherein said compressible gripper pad consists of a porous material and wherein said body portion consists of a non-porous material.

4. A gripping device according to claim 3 wherein said porous material consists of closed-cell bubbles providing the porosity.

5. A gripping device according to claim 3 wherein said body portion is produced from solid urethane.

6. A gripping device according to claim 5 wherein said gripper pad is laminated to said body portion.

7. A gripping device according to claim 3 wherein said non-porous body portion has a tensile strength allowing stretchability of said pull stems without breaking said stems during pulling of said anchoring head portions through said through-holes.

8. A gripping device according to claim 1 wherein said through-holes, column portions, anchoring head portions and pull stems are two in number.

9. A gripping device according to claim 2 wherein said irregular sheet-contacting surface on said first finger comprises serrations extending crosswise of the direction in which tension would normally be applied to said stretchable film.

10. A gripping device according to claim 9 wherein said gripping member on said first finger consists of neoprene having a durometer rating of essentially 70.

11. In a reciprocable gripping device for grasping a lateral free edge of a continuous roll of stretchable film at a first position, moving said gripping device and a section of film in a plane while attached to said roll to a second position and placing said film section under tension adjacent a package to be wrapped, said gripping device comprising a first set of gripping fingers having resilient gripping members on one side of said plane and a second set of gripping fingers having resilient gripping members on the opposing side of said plane, said finger sets being relatively movable toward and away from the plane of said film between an open position wherein film-contacting surfaces of said gripping members are free of contact with said film and a closed position wherein said surfaces contact and tightly grip said film therebetween to enable said film section to be pulled by said fingers from said roll as said gripping device moves from said first position toward and to said second position, the film-contacting surfaces of said first set of fingers being irregular and of relatively high durometer and the film-contacting surfaces of said second set of fingers being of lower durometer to cause film grasped under pressure between said high and lower durometer gripping members to conform to the shape of the irregular surfaces, the improvement comprising means for physically attaching said second gripping members to their respective gripping fingers without the use of an adhesive, including:

at least the distal end of said second set of gripping fingers being relatively thin and flat in the direction of reciprocable movement thereof and each gripping finger of said second set having a pair of closely spaced shouldered through-holes extending perpendicularly therethrough; and each said lower durometer gripping member comprising:

a). a readily compressible gripper pad having a side facing said film which includes said relatively flat film-contacting surface;

b). a body portion supporting said pad from the side thereof remote from said film; and c). a pair of resilient pad anchoring means connected to said body portion opposite said contact pad and being spaced apart the same as the spacing between said through-holes, each of said anchoring means including a column portion of a size and length corresponding to the size and length of a smaller-diameter portion of the through-hole in which it is to be received, an anchoring head portion of a size greater than said smaller-diameter portion of said through-hole, said anchoring head portion being sufficiently compressible to pass through said smaller-diameter portion, and a pull stem extending outwardly from each said anchoring head portion perpendicularly away from the film-contacting surface for a length enabling said stem to be threaded through a through-hole, manually gripped and physically pulled to apply a force to said head portion for urging said head portion therethrough to firmly anchor said head portion in said shouldered through-hole.

12. A gripping device according to claim 11 wherein said compressible gripper pads consist of a porous material and wherein said body portions consist of a non-porous material.

13. A gripping device according to claim 12 wherein said porous material consists of closed-cell bubbles providing the porosity.

14. A gripping device according to claim 12 wherein said body portions are produced from solid urethane.

15. A gripping device according to claim 14 wherein said gripper pads are laminated to said body portions.

16. A gripping device according to claim 14 wherein said non-porous body portions have a tensile strength allowing stretchability of said pull stems without breaking said stems during pulling of said anchoring head portions through said through-holes.

17. A gripping device according to claim 11 wherein said through-holes, column portions, anchoring head portions and pull stems are two in number.

18. A gripping device according to claim 11 wherein said irregular film-contacting surface comprises serrations extending crosswise of the direction in which tension would normally be applied to said stretchable film.

19. A gripping device for firmly grasping an edge of thin sheet material and retaining said grasp while said sheet material is placed under tension essentially in its own plane, said device comprising a first gripping finger on one side of said plane and a second gripping finger on the opposing side of said plane, at least one of said fingers being movable toward and away from said plane between an open sheet-releasing position and a closed sheet-grasping position, said second gripping finger having a resilient sheet gripping member on its distal end, the improvement comprising means for physically attaching said sheet gripping member to said second gripping finger, including:

at least the distal end of said second gripping finger being relatively thin and flat and having a shouldered through-hole extending therethrough perpendicularly to said flat distal end; and said sheet gripping member comprising:

a). a readily compressible gripper pad having a side facing said sheet material for contact therewith;

b). a body portion supporting said pad from the side thereof remote from said sheet material; and c). a resilient pad anchoring means connected to said body portion opposite said pad, said pad anchoring means including a column portion of a size and length corresponding to the size and length of a smaller-diameter portion of the through-hole, an anchoring head portion of a size greater than said smaller-diameter portion of said through-hole, said anchoring head portion being sufficiently compressible to squeeze through said smaller-diameter portion, and a pull stem extending outwardly from said anchoring head portion perpendicularly away from the sheet-contacting surface for a length enabling said stem to be threaded through a through-hole, manually gripped and physically pulled to apply a force to said head portion for urging said head portion therethrough to firmly anchor said head portion in said shouldered through-hole.

20. A gripping device according to claim 19 wherein a pair of equally-spaced through-holes and pad anchoring means are provided, one hole for each anchoring means.

21. A gripping device for firmly grasping an edge of thin sheet material and retaining said grasp while said sheet material is placed under tension essentially in its own plane, said device comprising a first gripping finger on one side of said plane and a second gripping finger on the opposing side of said plane, at least one of said fingers being movable toward and away from said plane between an open sheet-releasing position and a closed sheet-grasping position, opposing resilient sheet gripping members on distal ends of said fingers, said gripping member on said first finger having an irregular sheet-contacting surface and being of a relatively high durometer and said gripping member on said second finger having a relatively flat sheet-contacting surface and being of a durometer lower than said gripping member on said first finger to cause sheet material gripped between said surfaces to conform to the shape of the irregular surface when the gripping fingers are moved to their closed position, the improvement comprising means for physically attaching said lower durometer gripping surface to said second gripping finger, including:

at least the distal end of said second gripping finger being relatively thin and flat and having at least one through-hole extending therethrough perpendicularly to said flat distal end; and said lower durometer gripping member comprising:
 a). a readily compressible gripper pad having a side facing said sheet material which side includes said relatively flat sheet-contacting surface;
 b). a body portion supporting said pad from the side thereof remote from said sheet material; and
 c). at least one pad anchoring means connected to said body portion opposite said pad, said anchoring means including a column portion of a size and length corresponding to the size and length of the through-hole in which it is to be received, an anchoring head portion of a size greater than said column portion, said anchoring head portion being sufficiently compressible to squeeze through said through-hole, and a pull stem extending outwardly from said anchoring head portion perpendicularly away from the sheet-contacting surface for a length enabling said stem to be threaded through said through-hole, manually gripped and physically pulled to apply a force to said head portion for urging said head portion therethrough to firmly anchor said head portion to said second gripping finger.

* * * * *